United States Patent [19]

Kraus

[11] 4,149,660
[45] Apr. 17, 1979

[54] DIAL DISPENSER AND CANISTER

[76] Inventor: Harlen L. Kraus, P.O. Box 304, Colwich, Kans. 67030

[21] Appl. No.: 805,791

[22] Filed: Jun. 13, 1977

[51] Int. Cl.² ............................................ G01F 11/20
[52] U.S. Cl. ..................................... 222/368; 222/181
[58] Field of Search ............... 222/363, 366, 367, 368, 222/362, 361, 444, 452, 181, 180, 185, 325, DIG. 1, 363, 366, 367, 368, 444, 452; 221/266, 289, 283, 287; 248/225.1, 224.2; 285/282

[56] References Cited

U.S. PATENT DOCUMENTS

| 1,394,210 | 10/1921 | Miller | 222/368 X |
| 1,678,422 | 7/1928 | Dugdill | 285/282 X |
| 3,162,339 | 12/1964 | Lecluyse | 222/180 X |
| 3,223,296 | 12/1965 | Waddington et al. | 222/452 X |
| 3,669,318 | 6/1972 | Goksel | 222/366 X |

FOREIGN PATENT DOCUMENTS

| 1289650 | 2/1962 | France | 222/368 |
| 670709 | 10/1964 | Italy | 222/444 |

Primary Examiner—Robert J. Spar
Assistant Examiner—Edward M. Wacyra

[57] ABSTRACT

A dial dispenser and canister for holding powdered or granular material. The dispenser attached to the bottom of the canister for receiving a predetermined amount of material stored in the canister. The dispenser, by dialing, will discharge the material into a spoon, cup, or any other container eliminating the need of using a measuring device.

3 Claims, 5 Drawing Figures

DIAL DISPENSER AND CANISTER

BACKGROUND OF THE INVENTION

This invention relates generally to a dispenser attached to a canister and more particularly, but not by way of limitation, to a dial dispenser for receiving powdered or granular materials such as coffee, tea, sugar, or the like, from the canister in a predetermined amount for discharging the material therefrom.

Heretofore, there have been various types of dispensing and measuring devices for attaching to containers, canisters, or the like. Some of the prior art dispensers are integrally formed in the storage containers.

Other types of measuring devices and dispensers are constructed so that they may be quickly attached to cans, bottles, and various other types of containers for dispensing predetermined amounts of material from the container.

None of the prior art dispensers in combination with containers or canisters disclose the novel structure of the subject invention.

SUMMARY OF THE INVENTION

The subject invention provides means for receiving and discharging a predetermined amount of material which may be used in baking, cooking or any other use of the material stored in the canister. The dispenser eliminates the need of using a measuring cup, teaspoon, or similar measuring device.

The dispenser is streamlined in design, rugged in construction and can be quickly attached to the bottom of the canister. The dispenser can be made for receiving various predetermined amounts of material from the canister.

The invention is designed so that it can be quickly disassembled for cleaning purposes and reassembled for attachment to the canister.

The dispenser is easy to operate and provides means for quickly dialing predetermined amounts of material in the canister and discharging the amounts from the dispenser.

The dispenser and canister include a cylinder having a cavity in top of the cylinder for receiving a predetermined amount of material therein. The cylinder also includes a pin aperture for receiving a pin therein. The cylinder is inserted into an annular hollow sleeve. The sleeve includes an intake port in top of the sleeve which is indexed with the cavity in the cylinder. The sleeve further includes a discharge port in the bottom thereof for discharging the material from the cavity when the cylinder is rotated 180 degrees in the sleeve. The sleeve also includes a pin slot in portion of the circumference of the sleeve. The slot receives the top of the pin therein. As the cylinder is rotated in the sleeve, the pin is guided in the pin slot of the sleeve. An annular keeper ring is disposed around a portion of the outer circumference of the sleeve and covers the pin slot for securing the pin therein. A canister housing is communicably connected to the intake port of the sleeve for supplying the material to the cavity of the cylinder.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
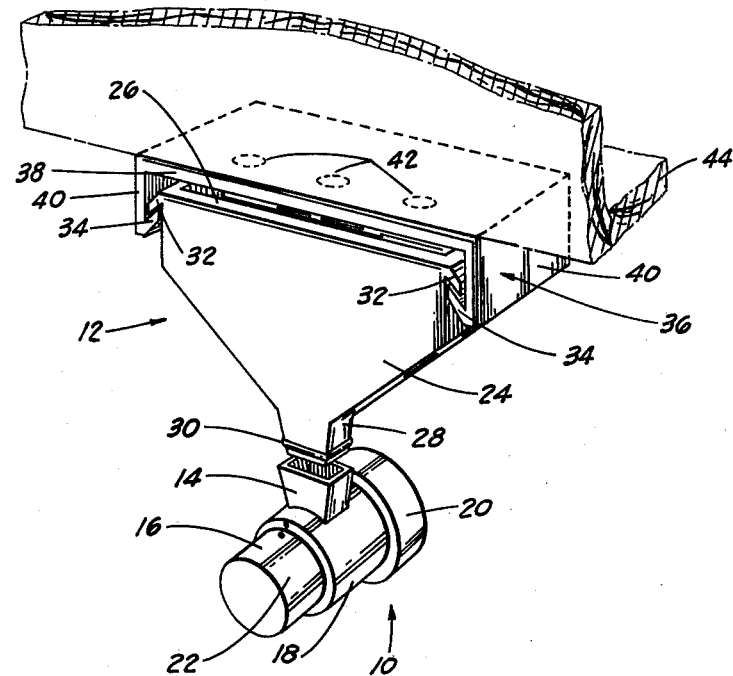
In FIG. 1, a perspective view of the dial dispenser and canister is illustrated.

In FIG. 1, the dial dispenser is designated by general reference numeral 10. The dispenser 10 is attached to the canister which is designated by general reference numeral 12. In this embodiment, the dispenser 10 is attached to the bottom of the canister 12 by a hollow dispenser connecter 14 mounted in the top of the dispenser 10.

The dispenser 10 includes a cylinder 16 rotatably mounted in an annular shaped hollow sleeve 18. Disposed around the rear of the sleeve 18 is an annular keeper ring 20. A front portion 22 of the cylinder 16 extends outwardly from the sleeve 18 and is used as a handle for dialing the cylinder 16 in the sleeve 18.

The canister 12 includes a canister housing 24 having an enlarged open top portion 26 for receiving powdered or granular material such as coffee, tea, sugar, or the like. While these types of materials are mentioned, it should be appreciatiated that many other types of materials may be stored in the canister 12 and discharged into the dial dispenser 10. While the canister 12 does not illustrate a top cover, a cover may be used to cover the open top portion 26 should it be necessary to protect the material therein. Sides of the canister 12 are tapered downwardly from the open top portion 26 to an open bottom portion 28 for funneling the material into the open bottom portion 28. The open bottom portion 28 includes an "O" ring 30 disposed around the sides of the open bottom portion 28 for providing a seal when the open bottom portion 28 is inserted inside the dispenser connecter 14.

The open top portion 26 of the canister housing 24 further includes outwardly extending arms 32 which are slidably received on inwardly extending flanges 34. The flanges 34 are part of a canister holder 36 which is characterized by having an inverted "U" shape with a horizontal base 38 and two parallel vertical downwardly extending arms 40. The flanges 34 are attached to the ends of the arms 40. The base 38 includes apertures 42 for attaching to a portion of a kitchen cabinet 44 or any similar mounting surface which is convenient for using the dispenser 10 and the canister 12.

Figures 2, 2A:
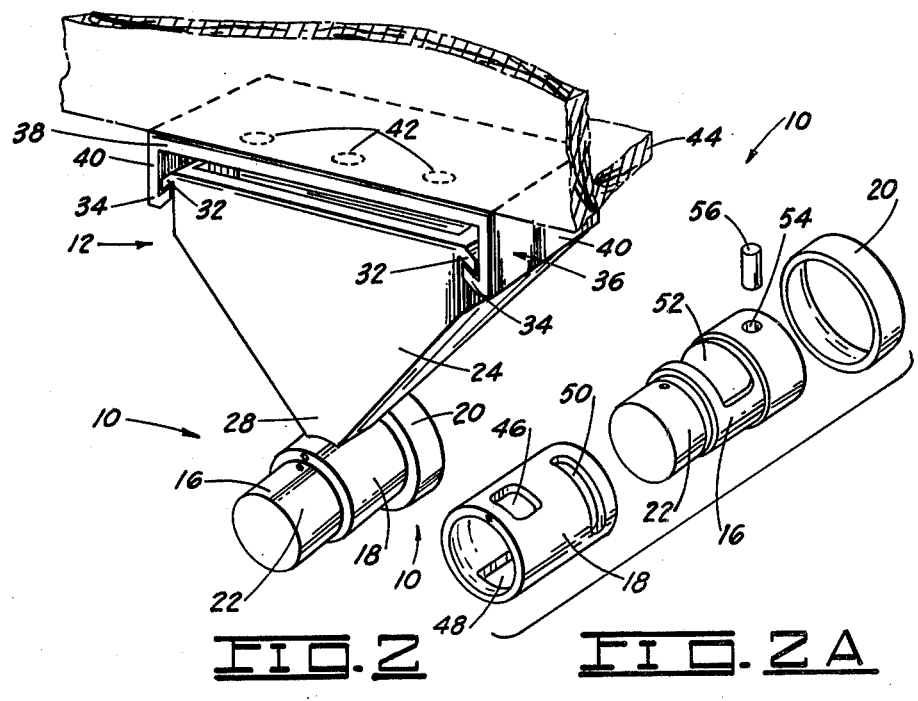
FIG. 2 illustrates an alternate embodiment of the dial dispenser and canister.
FIG. 2a illustrates an exploded view of the elements of the dial dispenser.

In FIG. 2, an alternate embodiment of the dispenser 10 and canister 12 is illustrated eliminating the dispenser connecter 14. The bottom portion 28 of the canister housing 24 is inserted directly into an intake port 46 in the top of sleeve 18. The intake port 46 is seen in the exploded view of the dispenser 10 shown in FIG. 2a.

In FIG. 2a, the sleeve 18 also includes a discharge port 48 in the bottom of the sleeve 18. The sleeve 18 also includes a pin slot 50 around a portion of the circumference of the hollow sleeve 18.

The cylinder 16 is inserted in the sleeve 18 with the front portion 22 extending outwardly from the front of the sleeve 18. The top of the cylinder 16 includes a cavity 52. The cavity 52 is formed in the cylinder 16 to receive a predetermined amount of material from the canister housing 24 and through the intake port 46 of the sleeve 18. The predetermined amount of material may, for example, be a teaspoon, tablespoon, or any other desired quantity depending on the size of the cavity 52. The size of the cavity 52 would be merely a matter of design choice.

The cylinder 16 also includes a pin aperture 54 for receiving the bottom of a pin 56 therein. When the sleeve 18 is slidably mounted around the cylinder 16, the pin 56 is inserted through the pin slot 50 into the aperture 54 with the top of the pin 56 held in place in the pin slot 50. The top of the pin 56 is guided in the pin slot 50 thereby guiding the cylinder 16 in the sleeve 18 when it is rotated therein. The keeper ring 20 is inserted over the rear of the sleeve 18 and the pin slot 50 for retaining the pin 56 therein.

Figure 3:
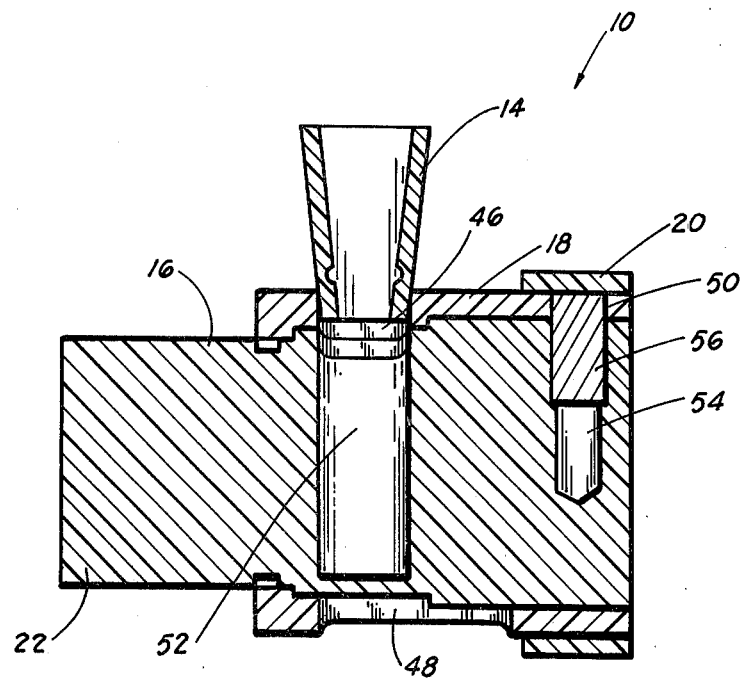
FIG. 3 is a side sectional view of the dispenser and dispenser connecter with the dispenser in a loading position.

In FIG. 3, a cross section of the dispenser 10 is shown with the cylinder 16 in a loading position for receiving a predetermined amount of material through the hollow connector 14, through the intake port 46, and into the cavity 52 in the cylinder 16. Also seen in this view is the ring 20 retaining the pin 56 in the aperture 54. The discharge port 48 is seen in the bottom of the sleeve 18.

Figure 4:
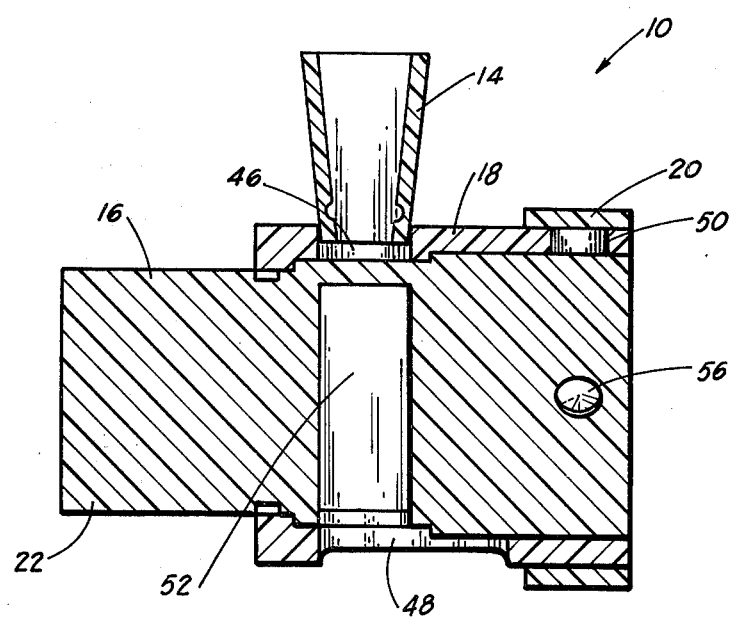
FIG. 4 is a side elevational view of the dispenser and dispenser connecter with the dispenser in an unloading position.

In FIG. 4, the front portion 22 of the cylinder 16 acting as a dial has been rotated thereby rotating the cylinder 16 in the sleeve 18 180 degrees and indexing the cavity 52 with the discharge port 48 in the bottom of the sleeve 18. In this position, the cylinder 16 is in an unloading position. When the material has been discharged from the cavity 52 through the discharge port 48, the cylinder 16 is again dialed upwardly rotating the cylinder 16 until the cavity 52 is again indexed with the intake port 46. The cavity 52 is then again filled with material received from the canister housing 24 through the connector 14.

Changes may be made in the construction and arrangement of the parts or elements of the embodiments as disclosed herein without departing from the spirit or scope of the invention as defined in the following claims.

I claim:

1. A dial dispenser for receiving powdered or granular material and discharging the material therefrom, the dispenser comprising:
    an annular shaped cylinder having a front portion, a center portion and a rear portion, the front portion used as a handle for dialing the dispenser and discharging the material therein, the center portion having a cavity in the top thereof, the cavity designed to receive a predetermined amount of material therein, the rear portion having a pin aperture in the top thereof;
    a pin slidably received in said pin aperture, the top of said pin extending upwardly above the top of said pin aperture;
    an annular shaped sleeve slidably received around the circumference of said cylinder, the front portion of said cylinder extending outwardly therefrom, said sleeve having an intake port in the top thereof and indexed with the cavity of said cylinder, a discharge port in the bottom thereof and indexed with the cavity of said cylinder when said cylinder is rotated 180 degrees in said sleeve, and a pin slot disposed around a portion of the circumference of said sleeve, the pin slot receiving the top of said pin therein, the slot acting as a guide for said cylinder when said cylinder is rotated in said sleeve;
    an annular keeper ring slidably received around a portion of said sleeve and covering the pin slot in said sleeve for retaining said pin therein; and
    a canister housing having an open top portion and an open bottom portion, the open bottom portion attached to the top of said sleeve and communicating with the intake port of said sleeve, the open top portion of said canister housing is enlarged and the sides of said canister housing tapered downwardly into the open bottom portion of said canister housing.

2. The dispenser as described in claim 1 further including an inverted "U" canister holder having a horizontal base and a pair of downwardly extending vertical arms, the ends of the arms having inwardly extending flange portions, the inwardly extending flange portions slidably engaging the sides of the open top portion of said canister housing.

3. A dial dispenser and canister, the canister holding powdered or granular material and storing the material for supplying the dispenser, the dispenser discharging the material therefrom, the dispenser and canister comprising:
    an annular shaped cylinder having a front portion, a center portion and a rear portion, the front portion used as a handle for dialing the dispenser and discharging the material therein, the center portion having a cavity in the top thereof, the cavity designed to receive a predetermined amount of material therein, the rear portion having a pin aperture in the top thereof;
    a pin received in said pin aperture, the top of said pin extending upwardly above the top of said pin aperture;
    an annular shaped sleeve slidably received around the circumference of said cylinder, the front portion of said cylinder extending outwardly therefrom, said sleeve having an intake port in the top thereof and indexed with the cavity of said cylinder, a discharge port in the bottom thereof and indexed with the cavity of said cylinder when said cylinder is rotated 180 degrees in said sleeve, and a pin slot disposed around a portion of the circumference of said sleeve, the pin slot receiving the top of said pin therein, the pin slot acting as a guide for said cylinder when said cylinder is rotated in said sleeve;
    an annular keeper ring slidably received around a portion of said sleeve and covering the pin slot in said sleeve for retaining said pin therein;
    a canister housing having an open top portion and an open bottom portion, the open top portion of said canister housing being enlarged and sides of said canister tapered downwardly into the open bottom portion;
    an inverted "U" shaped canister holder having a horizontal base and a pair of downwardly extending vertical arms, the ends of the arms having inwardly extending flange portions, the inwardly extending flange portions slidably engaging the sides of the open top portion of said canister; and
    a hollow dispenser connecter attached to the sides of the intake port of said sleeve and receiving the open bottom portion of said canister housing therein.

* * * * *